Feb. 6, 1962 V. STIGLIN 3,020,391

VEHICLE ILLUMINATION

Original Filed Oct. 7, 1954

INVENTOR.
VINCENT STIGLIN
BY Richards & Geier
ATTORNEYS

United States Patent Office 3,020,391
Patented Feb. 6, 1962

3,020,391
VEHICLE ILLUMINATION
Vincent Stiglin, 532 51st St., West New York, N.J.
Original application Oct. 7, 1954, Ser. No. 460,967, now Patent No. 2,921,180, dated Jan. 12, 1960. Divided and this application Oct. 29, 1959, Ser. No. 850,750
1 Claim. (Cl. 240—7.1)

This invention relates to a novel vehicle illumination system, more particularly a lighting system for the front and rear ends of automobiles, whereby said automobiles will be made more visible and thus enhance their safety during night time operation.

This application is a division of a prior co-pending application, Serial No. 460,967, filed October 7, 1954, now United States Patent No. 2,921,180.

Automobiles and other road vehicles are generally required by law to be provided with two head lights capable of illuminating the roadway before the vehicle, and a tail light serving to mark the rear end of the vehicle and visible from a distance therefrom. Aside from these minimal lighting requirements, automobile manufacturers have found it desirable for safety and aesthetic reasons to provide the head lights at the lateral limits of the front of the car, whereby oncoming cars at night may judge the width of approaching cars and accommodate their driving thereto. Tail lights are similarly provided at both lateral extremities of the rear of the car for the same purpose. It has been found, however, that there are occasions when one of these laterally placed lights fails to function. A safety hazard is thus created in that it becomes difficult, if not impossible, for other drivers to properly judge the width of the car, often mistaking it for a motorcycle having a single headlight or a car having a width considerably less than actual. Other accident hazards are engendered by the conventional laterally spaced head and tail lights in that on the multi-laned super highways of today where many cars ride in tandem, the galaxy of individual lights appearing to the observer does not serve adequately to delimit one car from the other. Thus, though the requirements of the law that cars be provided with adequate illumination are fulfilled, it is obvious that where the lights do not serve to indicate the true position of the vehicle, they create a safety hazard.

It is with the above problems in mind that the present construction has been evolved, a construction providing for a vehicle illuminating system serving to clearly delimit the bounds of said vehicle, and functioning to enhance the safety of operation and aesthetic appearance of the vehicle.

It is accordingly a primary object of this invention to provide a novel vehicle lighting system.

It is a further object of this invention to provide a vehicle lighting system serving to enhance the safety with which said vehicle may be operated during night driving conditions.

Another object of this invention is to provide an auxiliary lighting system for use in conjunction with conventional automobile lights serving to eliminate the dangers arising when one of said conventional head or tail lights fails to operate.

A still further object of this invention is to provide a novel lighting system for use in conjunction with vehicles which will serve to clearly delimit the boundaries of said vehicles to other drivers and pedestrians.

Another object of this invention is to provide a novel vehicle lighting system serving to enhance the aesthetic appearance of said vehicle.

These and other objects of the invention which will become apparent from the following disclosure and claims are achieved by provision of a lighting element extending between the laterally spaced vehicle headlights, and taillights, respectively, thus providing a continuous band of illumination across the front and rear of the vehicle. Energy necessary to illuminate said lighting element is supplied from both ends of said element from the conventional lights, whereby failure of one of these lights does not cause failure of the lighting element. The novel lighting element is made to blend with and enhance the appearance of the body contours of contemporary automobile design.

The specific construction details of the novel lighting system will be more particularly pointed out in the following specification taken in conjunction with the drawings wherein.

Figure 1:
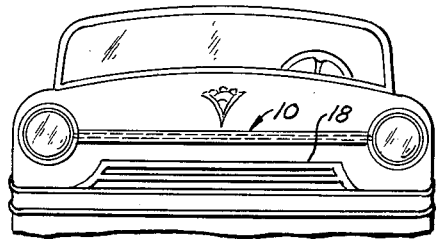
FIGURE 1 represents a front elevational view of a vehicle showing how the novel lighting system is positioned on the front of the vehicle between its headlights.
Figure 3:
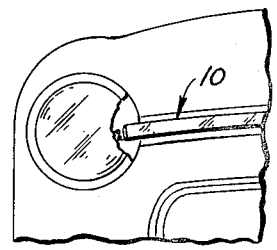
FIGURE 3 is a detailed view of the end of the novel lighting system at its point of connection with the conventional lights, showing the details of this connection in a preferred embodiment.

As best seen in the drawings, a lighting element 10 is provided for positioning on the front and rear of the vehicle extending between the conventionally placed laterally disposed head and taillights.

Figure 2:
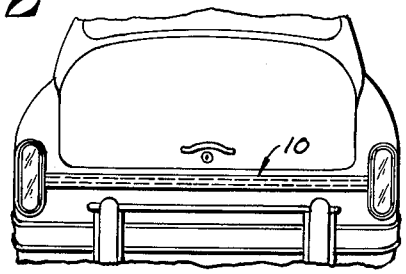
FIGURE 2 is a rear elevational view of a vehicle provided with the novel lighting system positioned between two rear taillights.
Figure 5:
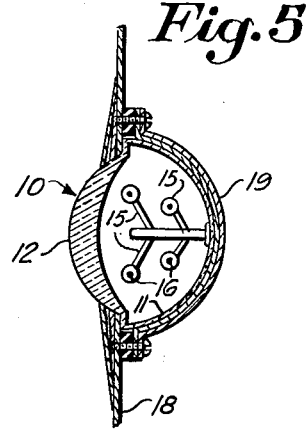
FIGURE 5 is a cross-sectional view through the novel lighting element whose detail is revealed in FIGURE 3.

As best seen in FIGS. 1 and 2, the novel lighting element is designed for incorporation within the body contour of a vehicle, and for positioning such that the body 18 of the vehicle envelops a portion of the lighting element, whereby the vehicle body serves to protect the lighting element by way of a gasketed housing 19 bolted to main body shell-structure 18, and the lighting element serves to enhance the appearance of the vehicle body. It is contemplated that all vehicles in conjunction with which the novel lighting element will be employed have at least two lights positioned at the lateral extremities of the front and rear of said vehicles.

Figure 6:
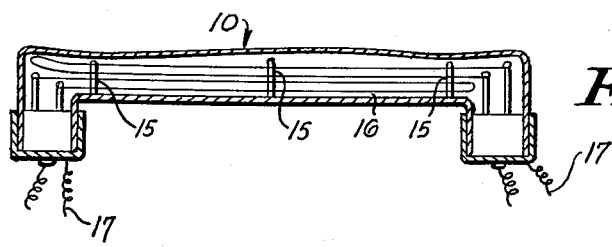
FIGURE 6 is a top plan view of the novel lighting element of FIGURE 3.

In one embodiment of the novel inventive concept, the lighting element 10 comprises an elongate, hollow, evacuated or gas filled tubular member having a rear arcuate surface 11 and a front arcuate surface 12 having a smaller radius of curvature than said rear surface. The front surface 12 may be thickened, as shown, to provide a diffusing lens or light diffusing portion. The rear surface 11 may be internally coated to provide a reflector. Filament supports 15 are spacedly positioned along rear arcuate surface 11. These filament supports 15 are designed to accommodate two sets of lighting filaments 16 of tungsten or the like. As best seen in FIGURE 6, one of these filaments extends from one side of the tube, the other from the opposite end. At each end of the tube a conductor 17 for each filament is provided leading to a connector adapted for coupling to the wiring system of the vehicle.

Figure 4:
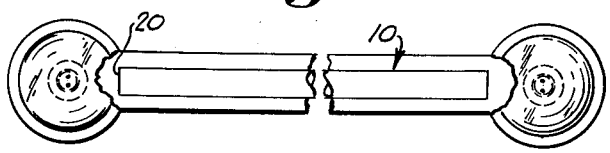
FIGURE 4 is a detail showing the inter-connection between the novel lighting element and the conventional vehicle lights of another embodiment of this invention.

In lieu of the filament lighted lighting element above disclosed, the construction revealed in FIGURE 4 may be employed. It is found that plastics, such as Lucite, will become illuminated over their entire surface area and act as light diffusing portions if a light source is positioned at any point on said plastic body. Thus, the novel lighting element may be constructed of an elongate tubular plastic member extending between and into light communication with the laterally placed vehicle lights. This is accomplished by providing suitable apertures 20 in the housings for said lights. The rear surface of this transparent plastic element may be coated with a reflecting material whereby the light in the element will be forwardly directed.

Where the novel lighting element is employed on the rear end of a vehicle, it may obviously be tinted red.

*Operation*

It is thus apparent that a lighting element has been provided which may be applied to a vehicle body extending between laterally positioned lights on the front and rear of said vehicles which in addition to serving to enhance the aesthetic appearance of said vehicle serves also to further identify the presence of the vehicle thereby increasing the safety with which it may be driven.

It will be observed that the novel lighting element is such that illumination thereof is obtained from two independent sources whereby failure of one of said sources will not eliminate proper functioning of the lights.

The above disclosure has been given by way of illustration and elucidation, and it is desired to protect all embodiments of the herein disclosed inventive concept within the scope of the appended claim.

What is claimed is:

In combination with a vehicle body having an end portion, two conventional lights and light-filled casings enclosing said lights and located in substantially the same plane at the lateral extremities of said end portion, said end portion having a recess conforming to the contour of said end portion and extending between said lights, said casings having opposed side openings; and a single elongated continuous tubular transparent plastic member having a rear portion located in said recess and a dome-shaped front portion protruding outwardly beyond said recess, said member having ends extending through the side openings of said casings, the front portion of said tubular member being light diffusing and being optically connected with said two lights to provide illumination constituting an uninterrupted continuation of said two lights and a reflecting coating upon the rear portion of said tubular member.

References Cited in the file of this patent

UNITED STATES PATENTS

| | | |
|---|---|---|
| 2,065,059 | De Lima | Dec. 22, 1936 |
| 2,207,117 | Collins | July 9, 1940 |
| 2,430,232 | Lynch | Nov. 4, 1947 |
| 2,566,026 | Hughes | Aug. 28, 1951 |
| 2,637,926 | Anderson | May 12, 1953 |
| 2,710,333 | Yates | June 7, 1955 |
| 2,922,873 | Bibbero et al. | Jan. 26, 1960 |